000000
United States Patent [19]

Nakanishi et al.

[11] 4,389,641
[45] Jun. 21, 1983

[54] ALPHANUMERIC DISPLAY

[75] Inventors: Yasuhiro Nakanishi; Yoshiyuki Fujikawa, both of Nara, Japan

[73] Assignee: Sharp Kabushiki Kaisha, Osaka, Japan

[21] Appl. No.: 272,694

[22] Filed: Jun. 11, 1981

[30] Foreign Application Priority Data

Jun. 13, 1980 [JP] Japan .................................. 55-80353

[51] Int. Cl.³ .............................................. G09G 3/36
[52] U.S. Cl. ..................................... 340/709; 340/711;
340/792; 340/802; 340/765
[58] Field of Search ............... 340/709, 711, 756, 765, 340/768, 792, 802

[56] References Cited

U.S. PATENT DOCUMENTS

| 3,965,466 | 6/1976 | Asada et al. | 340/756 |
| 4,024,531 | 5/1977 | Ashby | 340/792 X |
| 4,075,621 | 2/1978 | Salmon | 340/711 X |
| 4,219,808 | 8/1980 | Sado et al. | 340/756 |
| 4,298,865 | 11/1981 | Masuzawa et al. | 340/792 X |
| 4,307,391 | 12/1981 | Lewis | 340/792 X |
| 4,308,534 | 12/1981 | Yamamoto | 340/792 X |

Primary Examiner—David L. Trafton
Attorney, Agent, or Firm—Birch, Stewart, Kolasch & Birch

[57] ABSTRACT

A display device capable of selectively displaying numerical information or character information. During the mode wherein mainly characters are processed, a specific symbol (for example, a cursor symbol) is shifted digit by digit upon each actuation of a specific key (for example, a cursor key) and a character corresponding to the symbol display is also shifted. During the mode where numeral information is processed, on the other hand, numeral information or character information associated with said numeral information is selectively displayed upon actuation of the above specific key.

2 Claims, 4 Drawing Figures

| ADDRESS | CONTENTS |
|---|---|
| 00 | A |
| 1 | B |
| 2 | C |
| 3 | DATA |
| 4 | 1 |
| 5 | 2 |
| 6 | 3 |
| 7 | END |
| 8 | |
| 9 | |
| 10 | |
| 11 | |
| 12 | |

ALPHANUMERIC DISPLAY

BACKGROUND OF THE INVENTION

This invention relates to a display device for displaying at least character or numeral information. More particularly, the present invention relates to a display device of capable of displaying selectively character information or numeric information by sensing if a specific cursor symbol moving along with information now on a display panel upon depression of a specific key (for example, a cursor key) reaches an information display section of a predetermined digit length.

The so-called memo is useful as a memory aid means or an information transmission means depending upon its intended use or effect. In the past years, scratch pads and notes for receiving maniscripts were used as a memory aid but updating and amending such as adding those maniscripts were very inconvenient and time consuming. Furthermore, maniscripts with accompanying results of calculations took a substantial amount of time and demanded troublesome transcription procedures after those calculations.

When it is desirable to make up memos as a device for transmitting information, drawing up correct sentences with legible characters is indispensible for transmission of correct information to the recipient. The time-honored manner depended upon the use of a typewriter or a scratch pad and there is therefore a great demand for the development of an easier and more reliable device or equipment. Particularly when the memo is to be used outdoor, it is not fully successful as a device of information transmission.

A new device free from the above disadvantages is expected which involves 1. handling information, 2. drawing up memos with accuracy upon simple actuation of keys and 3. conveying information through printing the same on a journal as a vehicle. This new device may be called a memo writer. The memo writer provides a wide range of persons covering company clerks, retailers, salesmen and other persons who often make business trips with an easy tool of drawing up memos as well as a tool of processing information contained in memos such as computing daily sales.

The present invention is directed to a new display device most suitable for the above mentioned new device. When it is desired to display information of a length exceeding the capacity of an alphanumeric display panel, the information is shifted digit by digit (a) automatically or (b) through actuation of a cursor key. However, with the latter method by which the information is shifted digit by digit upon each actuation of the cursor key, recognizing numeric information is time consuming and difficult while recognizing character information is easy.

OBJECTS AND SUMMARY OF THE INVENTION

With the foregoing in mind, it is an object of the present invention to provide a display device capable of selectively displaying numerical information or character information. During the mode wherein mainly characters are processed, a specific symbol (for example, a cursor symbol) is shifted digit by digit upon each actuation of a specific key (for example, a cursor key) and a character corresponding to the symbol display is also shifted. During the mode where numeral information is processed, on the other hand, numeral information or character information associated with said numeral information is selectively displayed upon actuation of the above mentioned specific key.

It is another object of the present invention to provide a display device in which it is easy to select and display character information or numeral information through simple actuation of a key.

It is still another object of the present invention to provide a display device which displays easily read numeral information without requiring a substantial amount of time for display.

It is still another object of the present invention to provide a display device which is most desirable for displaying information of a length exceeding the capacity of a display panel.

BRIEF DESCRIPTION OF THE DRAWINGS

For a more complete understanding of the present invention and for further objects and advantages thereof, reference is now made to the following description taken in conjunction with the accompanying drawings showing a mode selection assembly for use in a tape recorder or the like in accordance with an embodiment of the present invention, in which.

DETAILED DESCRIPTION OF THE INVENTION

Figure 1:
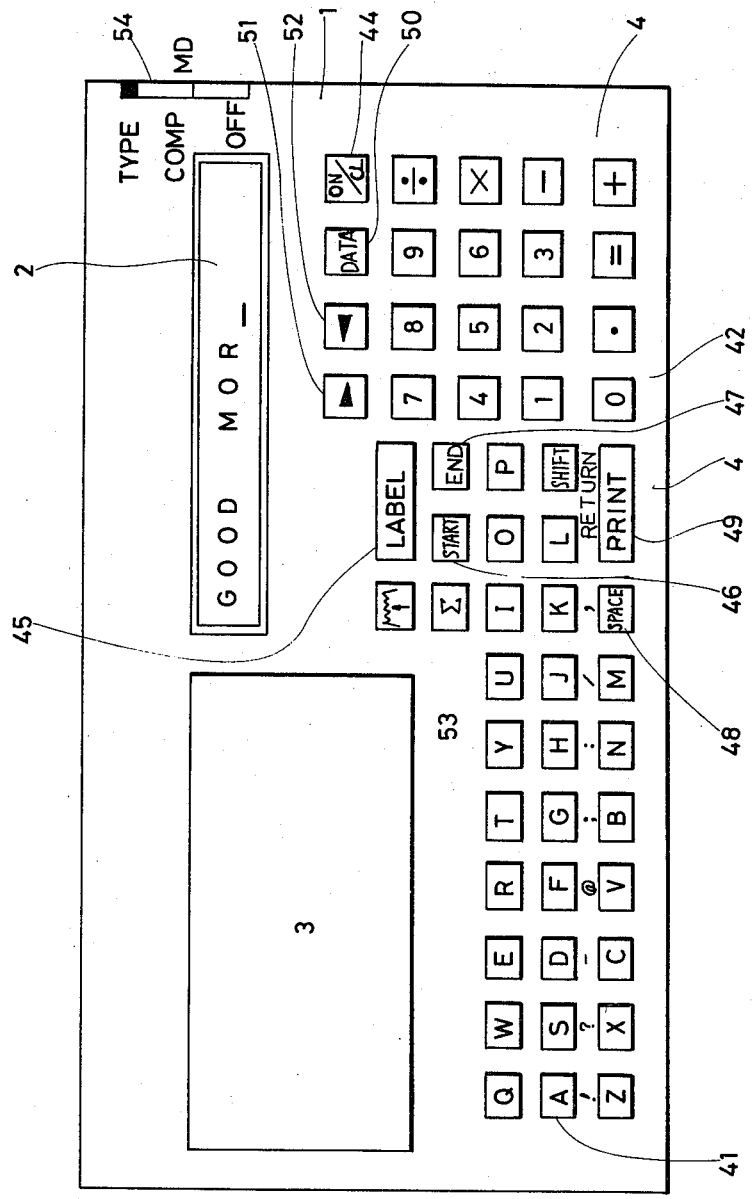
FIG. 1 is a perspective view of an information handling apparatus embodying the present invention.

Referring now to FIG. 1, there is illustrated a perspective view of an information handling apparatus which includes a main body 1, an alphanumeric display 2 made of a 10-digit liquid crystal dot matrix display panel, for example, a printer 3 capable of printing alphabet and numeral characters at one time and, if necessary, repeatedly, and a key input board 4. The key input board 4 includes 26 alphabet (A to Z) keys 41, digit keys (1 to 9) 42, operation keys 43 such as +, −, ×, ÷, =, a clear (CL) key 44, a label (LABEL) key 45, a writing start (START) key, a writing completion (END) key 47, a space (SPACE) key 48, a print (PRINT) key 49, a numeric information (DATA) specifying key 50, a cursor up (►) key 51, a cursor down (◄) key 52, a memory calculation (Σ) key 53 and a mode selector (MD) switch 54. The mode switch has a mode (TYPE) for entering and amending character information and so forth and a mode (COMP) for ordering the delivery of character information and so forth. The TYPE mode is in effect when words are processed and the COMP mode is in effect when numerals are processed. The power supply is switched on when the mode switch 54 is placed into the TYPE mode or the COMP mode and switched off when the same is in off position.

Figure 2:
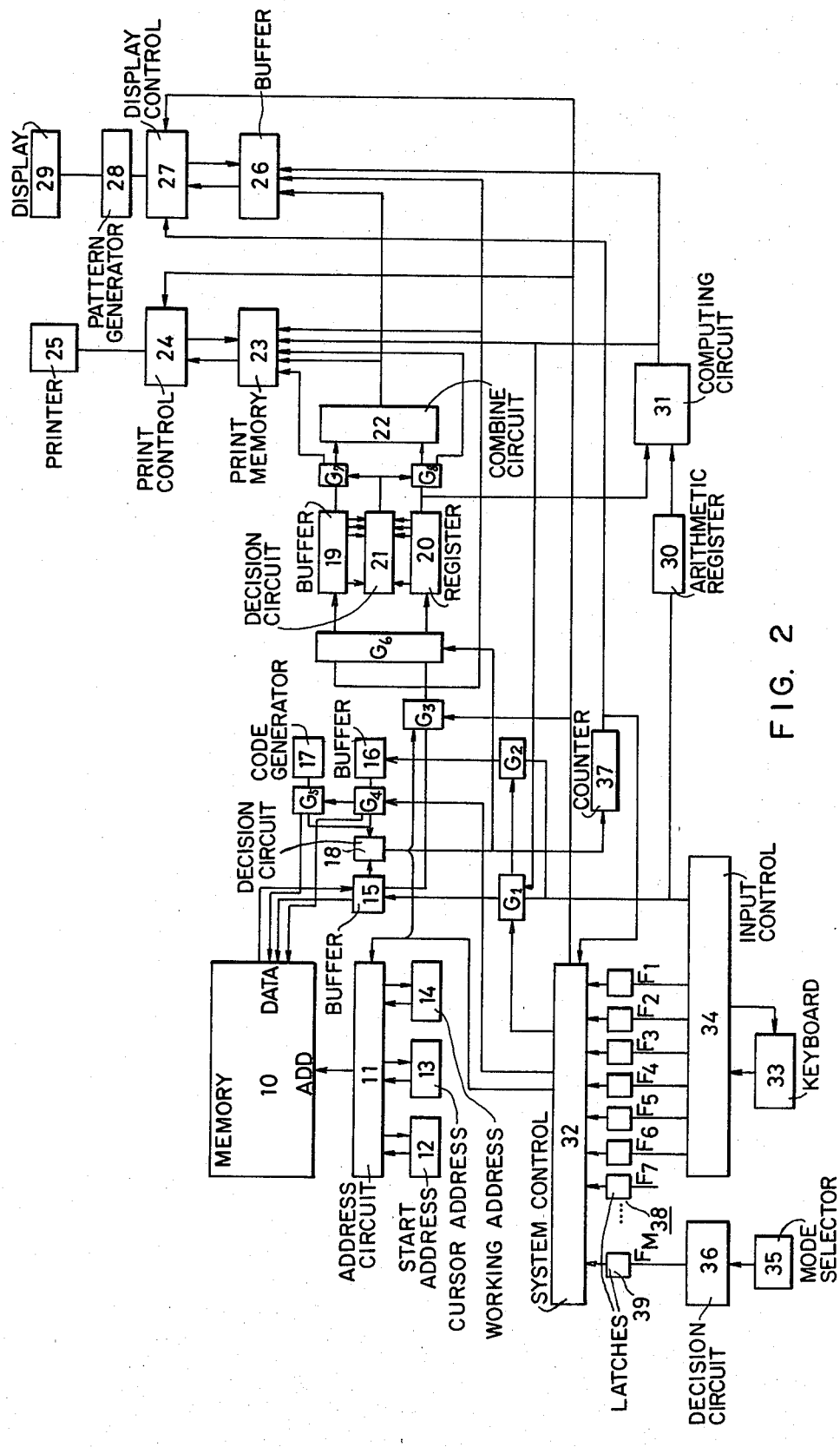
FIG. 2 is a block diagram of an example of a principal circuit used in the above apparatus.

FIG. 2 is a block diagram of a principal circuit for putting the present invention into practice. There is provided a memory 10 for storing character information, numeral data and so forth, an address circuit 11 for providing access to a desired address of the memory 10, a circuit 12 for storing the start address of a selected one of information blocks, a circuit 13 for storing a specific address (cursor address) of the selected information block, a working address circuit 14 for specifying a particular address of the memory 10, a buffer circuit 15 for holding coded input information (character information or numeral information) introduced via the output of the memory 10 or the key input board and a buffer circuit 16 for holding coded input information introduced via the key input board for comparison with the output of the first named buffer circuit 15. A code generator 17 is adapted to generate any desired code. A decision circuit 18 senses if there is agreement between the outputs of the buffer circuits 15 and 16 and the output of the code generator 17. A buffer circuit 19 holds the coded output of a lenght corresponding to the capacity of the printer or the display panel as derived from the memory 10. A data register 20 is adapted to hold a numeral section out of the output of the memory 10. A decision circuit 21 makes decision digit by digit as to wether the output of the character information holding buffer circuit 19 is in agreement with the counterpart of the data register 20. A combination circuit 22 receives the outputs of the character buffer 19 and the data register 20 and develops sequentially the logical sum thereof. A memory circuit 23 holds the contents to be printed and a printer control 24 receives the output of the memory circuit 23 and controls operation of a printer 25. A display buffer circuit 26 holds the contents to be displayed and a display control 27 receives the output of the display buffer 26 and controls operation of an output display panel 29 (corresponding to the display panel 2). There is further provided a pattern generator 28, an arithmetic register 30 for holding the numeral information introduced via the keyboard and providing the same to a numeral information computing circuit 31 which receives the numeral information from the registers 30 and 20, executes a desired computation and provides the result of such a computation, a system control 32 and keys 33 for introduction of alphabets, numerals or other characters (corresponding to the key input board 4 of FIG. 1).

A key input control 34 receives an output from a selected one of the keys 33, delivers its corresponding coded key output, senses the meaning of the key output and develops an output representative of its result. A mode selector 35 corresponds to the mode selector 54 of FIG. 1. A decision circuit 36 receives the output of the mode selector 35 and supplied the result of its decision to the system control 32. A counter 37 executes counting in response to operation of the agreement circuit 18. A latch circuit 38 receives the outputs $F_1$–$F_7$ of the key control 33 and itself holds its condition. A latch circuit 39 receives the output of the decision circuit 36 operatively associated with the mode switch 35. A family of gates $G_1$–$G_8$ is governed by instructions from the system control 32, the agreement circuit 18 and the combination circuit 22.

Figures 3, 4:
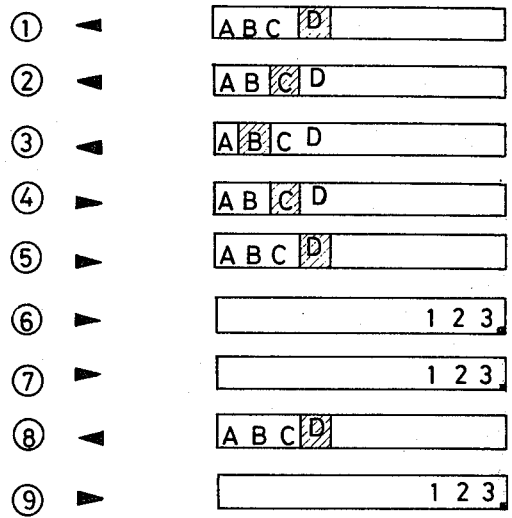
FIG. 3 is a view showing an example of the contents of a memory in the above block diagram.
FIG. 4 is a view of a display pattern.

Key actuations and modes of operation according to the present invention will be more clearly understood from a consideration of FIG. 3 showing the contents of the memory 10 and FIG. 4 showing the progress of a display pattern.

KEY ACTUATIONS

In FIG. 3, numeral information (1, 2, 3) and character information (A, B, C) are contained within desired storage regions of the memory 10, both of which are partitioned by a specific code (for example, DATA).

When the character information is being displayed on the display panel as seen from FIG. 4, a cursor symbol ▨ may be shifted digit by digit optionally upon actuation of a specific key (the cursor key ◂ or ▸ ) as illustrated by steps ① – ⑤ . If a symbol "D" indicative of the "DATA" code is reached, then the apparatus changes selectively from the character information display mode to the numeral information display mode upon depression of the cursor key ▸ (right shift) as seen from steps ⑤ – ⑥ . Under these circumstances depression of the cursor ( ▸ ) key is considered as invalid as seen from step ⑦ and depression of the cursor ◂ key regains the character information display mode via step ⑧ . Accordingly, whether the cursor symbol moves over the character information display region is decided (as with the aid of the DATA code) on the basis of the presence of the "DATA" code to enable the display for displaying selectively the character information or the numeral information.

MODE OF OPERATION

The following will set forth an example of the operation by which the contents of the memory are displayed. When the contents of the memory are fetched and displayed, codes following the DATA code are treated as numeral information so that they are not displayed at the same time as when character information is displayed. In other words, assuming the cursor symbol ▨ stands at #2 address (as denoted by "C") as seen from step ② , the cursor address is within "00" address through "09" address so that the address selection circuit 11 finds the feasibility of displaying information beginning with "00" address and therefore "00" address is placed into the working address circuit 14. The output of the address circuit 14 is provided in sequence for the input of the buffer circuit 15 and transferred to the display buffer circuit 26 under control of the gate $G_3$. At this moment the code generator 17 develops the DATA code indicative of the boundary between the character information and the numeral information and the agreement circuit 18 decides from time to time whether the code from memory 10 is in agreement with the "DATA" code. If so, the output of the agreement circuit 18 is supplied to the display control 27 and the address selection circuit 11. As a consequence, the succeeding output of the display buffer 26 are no longer supplied. In other words, display mode as defined by steps ① through ⑤ is possible. If the cursor ▸ key is actuated in the display step of ⑤ , the display mode proceeds with step ⑥ . While the count of the cursor address memory circuit 13 is incremented upon actuation of the cursor ▸ key, decision as to whether the contents of the memory 10 as specified by the cursor address memory circuit 13 correspond to the "DATA" code is achieved through the use of the ouputs of the code generator 17, the agreement decision circuit 18 and the buffer circuit 15. The fact that the output of the memory 10 is the "DATA" code in step ⑤ means that the next succeeding display is concerned with the numeral information. When displaying the numeral information is desirable, the contents of the cursor address memory circuit 13 indicate #4 address (numeral "1") and are loaded into the working address circuit 14. Under control of the buffer circuit 15 and the gates $G_3$ and $G_6$ the contents of the data register 20 are fed to the display buffer 26 to perform display step ⑥ . When the cursor ◂ key is actuated under these circumstances, the count of the cursor address memory circuit 13 is decremented by the action of the address selection circuit 11 and loaded again into

3 address where the "DATA" code is seated. This completes step ⑤ or step ⑧.

It is evident from the foregoing that the display device according to the present invention decides if the specific cursor symbol movable upon actuation of the specific key goes over the character display region of a predetermined length and displays selectively the character information or the numeral information in response to a simple key actuation. Furthermore, the display device provides an easy-reading display with a minimum of time. Selective display of the character information or the numeral information enables both with a total of length exceeding the capacity of the display panel to be displayed.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A display device capable of displaying selectively numerical information or character information on a display panel, said display device comprising:
    means for sensing if a specific cursor symbol moving along information now on said display panel upon depression of a specific key reaches an information display section of a predetermined digit length; and
    means for displaying selectively said character information or said numerical information in response to the output of said sensing means.

2. A display devide according to claim 1 wherein said specific key is a cursor key.

* * * * *